July 1, 1930.  W. MINNICH  1,769,748
DEVICE FOR SPRAYING COSMETICS AND OTHER LIQUIDS
Filed July 26, 1928
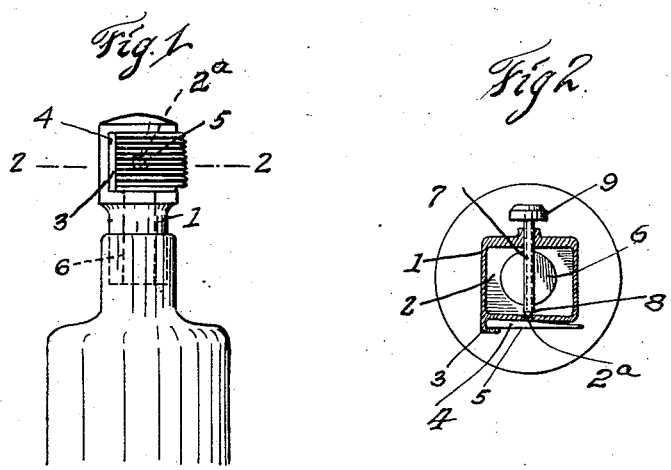
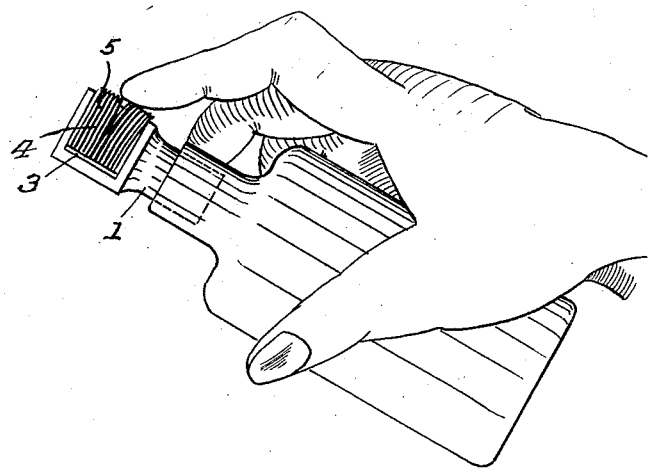
Inventor:
Willy Minnich.
By ⟨signature⟩
Att'y Patented July 1, 1930

1,769,748

UNITED STATES PATENT OFFICE

WILLI MINNICH, OF HAMBURG, GERMANY, ASSIGNOR TO KROGER & CO., OF ALTONA-BAHRENFELD, GERMANY

DEVICE FOR SPRAYING COSMETICS AND OTHER LIQUIDS

Application filed July 26, 1928, Serial No. 295,605, and in Germany August 31, 1927.

This invention relates to improvements in spraying devices intended for spraying liquid perfume or the like.

The object of the invention is to provide a device which can be readily and conveniently inserted in the mouth of a bottle containing the liquid perfume and provided with means whereby the liquid can be brought into contact with a spraying or comb-like structure, which when frictionally manipulated by the finger, will spray the perfume.

A further object of the invention is to provide a comb-like stopper to be used with a bottle, whereby the contents of the bottle can be sprayed by manipulating the teeth of the comb.

A still further object of the invention is to provide a spraying device with a regulating means, such as a valve to control the volume of liquid admitted to the sprayer and arrange the parts that the device can be employed as a cork.

In the drawings:

Fig. 1 is a side elevation illustrating the application of the invention.

Fig. 2 is a horizontal section on the line 2—2 of Fig. 1.

Fig. 3 is a side elevation illustrating the operation of the invention.

1 indicates a cork, the lower portion of which is adapted to fit in the mouth of a bottle, while the upper portion is enlarged and is hollow to form a chamber 2, one wall of which is formed with an opening 2ª. At one edge of the side of the chamber in which the opening 2ª is formed is a vertical grooved flange 3 to receive the rear bar of a comb 4, provided with flexible teeth 5, the free edges of the teeth extending beyond the plane of the adjacent side wall of the enlarged portion or chamber 2, as best shown in Fig. 2.

The cork 1 is formed with a central opening 6 which communicates with the chamber 2, and mounted in one wall of the chamber 2 is a valve rod 7, the inner end of which is bevelled at 8 to form a valve to fit in and control the opening 2ª. One end of the rod 7 extends beyond the chamber wall and is provided with a knob 9 for conveniently opening and closing the valve to control the liquid passing to the comb.

In operation, the device is inserted in the mouth of a bottle and the valve is opened sufficiently to allow liquid to flow through the opening 2ª to the comb, when the bottle is tilted or shaken. The liquid passes through the opening 2ª to the teeth of the comb, and then by passing the finger over the free ends of the teeth, for instance as shown in Fig. 3, the perfume or other liquid is sprayed.

The liquid passes between the teeth and adheres thereto and because of the flexibility of the teeth and the rapidity of their movement when running the finger over the ends, causes a spraying action.

The invention, while designed primarily for toilet purposes, is well adapted for other uses where a spraying of liquid is desired.

What I claim is:

1. A device of the class described, comprising a hollow cork formed at its upper end with an enlarged chamber with one wall thereof provided with an opening, a comb secured to the chamber wall and extending across said opening, the free ends of the teeth of the comb extending beyond the face of the chamber wall and adapted to be flexed to spray liquid adhering to the comb, and means for supplying the chamber with liquid.

2. A device of the character described, comprising a hollow cork having an opening in one side, a comb extending over the opening, the teeth of the comb extending beyond the face of the cork and adapted to be flexed to spray liquid adhering to the teeth, and means to supply liquid to the hollow cork.

3. A device of the character described, comprising a hollow cork having an opening in the side thereof, a valve to control the opening in the hollow cork, a comb secured to the cork across the opening therein, the teeth of the comb extending beyond the face of the cork and adapted to be flexed to spray liquid adhering thereto, and means to supply liquid to the hollow cork.

4. A device of the character described, comprising a hollow cork formed at its upper end with an enlarged chamber, one wall of which is formed with an opening and a vertical edge flange, a comb fastened to the flange and extending over the opening, the teeth of the comb extending beyond the wall of the chamber and adapted to be flexed to form a spray of liquid adhering to the teeth, and a valve in the cork to control the flow of liquid from said chamber through said opening, and means to supply liquid to the enlarged chamber.

In testimony whereof I affix my signature.

WILLI MINNICH.